United States Patent
Tsai et al.

(10) Patent No.: US 11,525,811 B2
(45) Date of Patent: Dec. 13, 2022

(54) DETECTION SYSTEM AND DETECTION METHOD

(71) Applicant: Industrial Technology Research Institute, Hsinchu (TW)

(72) Inventors: Yao-Long Tsai, Hsinchu (TW); Tai-Ping Tsai, Hsinchu (TW); Li-Hua Wang, Hsinchu (TW); Yi-Tsung Pan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1020 days.

(21) Appl. No.: 16/235,650

(22) Filed: Dec. 28, 2018

(65) Prior Publication Data

US 2020/0209196 A1 Jul. 2, 2020

(51) Int. Cl.
*G01N 29/12* (2006.01)
*G01N 29/44* (2006.01)
(Continued)

(52) U.S. Cl.
CPC ........... *G01N 29/12* (2013.01); *G01N 29/043* (2013.01); *G01N 29/11* (2013.01);
(Continued)

(58) Field of Classification Search
CPC .... G01N 29/12; G01N 29/4427; G01N 29/11; G01N 29/4472; G01N 29/46;
(Continued)

(56) References Cited

U.S. PATENT DOCUMENTS

| | | |
|---|---|---|
| 4,457,163 A | 7/1984 | Jackle |
| 5,117,676 A | 6/1992 | Chang |

(Continued)

FOREIGN PATENT DOCUMENTS

| | | |
|---|---|---|
| CN | 1389743 A | 1/2003 |
| CN | 101303268 A | 11/2008 |

(Continued)

OTHER PUBLICATIONS

Notice of Allowance dated Sep. 11, 2019 in corresponding Taiwanese Patent Application No. 10820860580.

(Continued)

*Primary Examiner* — Helen C Kwok
(74) *Attorney, Agent, or Firm* — Fox Rothschild LLP

(57) ABSTRACT

A sound source device and a signal receiver are disposed at first and second ports of a target object, respectively. A sound of a specific frequency of the sound source device is introduced into the target object to generate a resonant sound wave. A computer simulates a signal generated when the resonant sound wave is received by the signal receiver and regarding the signal as reference information. The reference information comprises first data having characteristics of the resonant sound wave, and data having features of an imaginary defect formed on the target object. The features of the imaginary defect correspond to the characteristics of the resonant sound wave. When the target object has a real defect, the sound of the specific frequency of the sound source device is introduced into the target object. Features of the real defect are derived by comparing the first data with the second data.

18 Claims, 16 Drawing Sheets

(51) Int. Cl.
*G01N 29/11* (2006.01)
*G01N 29/04* (2006.01)
*G01N 29/48* (2006.01)
*G01N 29/46* (2006.01)

(52) U.S. Cl.
CPC ......... *G01N 29/4427* (2013.01); *G01N 29/46* (2013.01); *G01N 29/48* (2013.01); *G01N 2291/014* (2013.01); *G01N 2291/0289* (2013.01)

(58) Field of Classification Search
CPC ................ G01N 29/48; G01N 29/043; G01N 2291/014; G01N 2291/0289
See application file for complete search history.

(56) References Cited

U.S. PATENT DOCUMENTS

| | | | |
|---|---|---|---|
| 5,361,636 A | 11/1994 | Farstad et al. | |
| 7,777,118 B2 | 8/2010 | Stoneback | |
| 2002/0035437 A1* | 3/2002 | Tingley | G01N 22/02 702/51 |
| 2005/0107963 A1* | 5/2005 | Campbell | G05B 17/02 702/42 |
| 2005/0182613 A1* | 8/2005 | Kwun | G01N 29/043 702/35 |
| 2006/0039322 A1* | 2/2006 | Furse | G01R 31/11 370/328 |
| 2007/0017800 A1* | 1/2007 | Cetinkaya | H01J 37/3482 204/192.1 |
| 2008/0314122 A1 | 12/2008 | Hunaidi et al. | |
| 2015/0114120 A1 | 4/2015 | Schroder | |
| 2018/0292356 A1* | 10/2018 | Findikoglu | G01N 29/4409 |
| 2020/0159976 A1* | 5/2020 | Kumar | G06F 30/20 |

FOREIGN PATENT DOCUMENTS

| | | |
|---|---|---|
| CN | 202040546 U | 11/2011 |
| CN | 202040552 U | 11/2011 |
| CN | 102625912 A | 8/2012 |
| CN | 103292160 A | 9/2013 |
| CN | 102630302 B | 11/2014 |
| CN | 105911137 A | 8/2016 |
| CN | 105972442 A | 9/2016 |
| CN | 105987954 A | 10/2016 |
| CN | 206600624 U | 10/2017 |
| CN | 110231409 A | 9/2019 |
| TW | I 630379 B | 7/2018 |
| TW | 201830000 A | 8/2018 |
| WO | 2013/145492 A1 | 10/2013 |

OTHER PUBLICATIONS

Office Action dated Oct. 23, 2020 in corresponding Chinese Patent Application No. 201911256397.X.
Detection and Location of a Leak in a Gas-Transport Pipeline by a new Acoustic Method, Kajiro Watanabe, AIChE Journal 32(10): 1690-1701 • Oct. 1986.
Office Action dated May 6, 2021 in corresponding Chinese Patent Application No. 201911256397.X.

* cited by examiner

DETECTION SYSTEM AND DETECTION METHOD

BACKGROUND

1. Technical Field

This disclosure relates to detection systems and detection methods, and, more particularly, to a detection system and a detection method that apply to sound waves.

2. Description of Related Art

The pipeline required for living or industrial use is complex, for example, a natural gas pipeline of 35,000 kilometers long and an oil pipeline of 4,060 kilometers long are distributed in Taiwan. A gas pipeline of at least 3.5 million kilometers long is distributed in the world, and has aged for more than 40 years. The aged pipeline is badly corroded and significantly degraded, and causes accidents frequently.

In recent years, industrial safety accidents related to industrial pipeline occur mainly due to surface defects formed by external forces and/or material degradation of the industrial pipeline. Polluted environment also erodes the pipeline and forms fissures or even thins the pipeline wall structure. As a result, holes and fissures appear. If such holes and fissures can be detected in time, accidents can be prevented.

In general detecting methods, when the pipeline is cracked, the pressure therein will be released suddenly. And then a resonant sound wave will be generated passively, which can be detected at any position of the pipeline, in order to know where the crack appears. However, such passively generated resonant sound wave does not have enough strength and is likely interfered by noises, and instrument can hardly detect the resonant sound wave. In some occasions, the pressure in the pipeline is too small to actuate any resonant sound wave, and, of course, the instrument cannot detect any resonant sound wave, either. The general method of receiving the resonant sound wave passively is applied to liquid pipeline only, and cannot be applied to a gas pipeline (e.g., a natural gas pipeline).

Hence, some manufacturers try to solve the drawbacks of the method of receiving the resonant sound wave passively. A sound emitter provides a sound of a global bandwidth (i.e., at a frequency of 0-∞ Hz) into a pipeline. A resonant sound wave will be actuated if the frequency in the bandwidth is equal to the resonant frequency of the liquid in the pipeline. A plurality of signal receivers can be disposed on the pipeline to detect where the defects are formed on the pipeline.

However, for a long-distance pipeline the energy of the sound emitted by the sound emitter may be very large, and the sound emitter has to consume a lot of power and volume of equipment is large.

Moreover, in some cases, there are too many frequencies, i.e., the global bandwidth, that have to be detected, and too many signal data that have to be analyzed and processed. Therefore, in this case the determining and processing speed is low, where the positions of defects cannot be known in real time. And the detection accuracy is poor (e.g., the position determining error is more than ±50 meters). Accordingly, a large area of road has to be dug, which brings inconvenience to people walking or driving on the road.

Furthermore, in some cases, the pipeline has to be disposed with a plurality of signal receivers on various positions thereof, and has to modulate the energy of sounds emitted by the sound emitter, to ensure the pipeline can receive the sound wave anywhere, even at a position where the pipeline is bent. Accordingly, a great number of signal receivers have to be used, and a great area of road has to be dug in order for these signal receivers to be disposed on the pipeline, which increases the cost of the detection process significantly.

Therefore, how to overcome the drawbacks of the cases aforementioned is becoming one urgent issue in the art.

SUMMARY

In view of the abovementioned drawbacks, the present disclosure provides a detection system for detecting a defect of a target object that has an accommodating space and first and second ports on the accommodating space. The detection system comprises: a sound source device disposed at the first port and configured for providing and inputting a sound through the first port into the accommodating space to generate a resonant sound wave; a signal receiver disposed at the second port; and a database configured for storing reference information derived from simulation of a signal generated after the resonant sound wave is received by the signal receiver. The reference information comprises first data having characteristics of the resonant sound wave and data having features of an imaginary defect formed on the target object. The features of the imaginary defect correspond to the characteristics of the resonant sound wave. The signal receiver is configured for receiving the resonant sound wave to obtain target information and transmitting the target information to the database, and the target information comprises second data having characteristics of the resonant sound wave when the target object has a real defect, and features of the real defect corresponding to the second data are derived from the features of the imaginary defect corresponding to the first data, by comparing the target information with the reference information.

The present disclosure further provides a detection method, comprising: providing a target object having an accommodating space and a first port and a second port on the accommodating space, and disposing a sound source device at the first port and a signal receiver at the second port, respectively; enabling the sound source device to input a sound via the first port into the accommodating space to generate a resonant sound wave; simulating a signal generated when the resonant sound wave is received by the signal receiver and regarding the signal as reference information, wherein the reference information comprises first data having characteristics of the resonant sound wave and data having features of an imaginary defect formed on the target object, and the features of the imaginary defect correspond to the characteristics of the resonate sound wave. When the target object has a real defect, the signal receiver obtains target information where the resonant sound wave is received at the second port, wherein the target information comprises second data having characteristics of the resonant sound wave when the target object has the real defect. The method further comprises comparing the target information with the reference information to derive features of the real defect corresponding to the second data from the features of the imaginary defect corresponding to the first data.

In an embodiment, the accommodating space of the target object contains gas or fluid.

In an embodiment, the target object is a pipe, a trough or any other suitable structures, regardless of whether the accommodating space is close or open.

In an embodiment, the sound source device provides sounds of different frequencies.

In an embodiment, the sound source device provides sounds at different volumes.

In an embodiment, the resonant sound wave is in a standing wave state in the accommodating space.

In an embodiment, the characteristics of the resonant sound wave are a frequency shift or strength.

In an embodiment, the first data (their sources) are derived from sounds of a plurality of simulation frequencies provided by the sound source device, and the second data (their sources) are derived from sounds of a target bandwidth band provided by the sound source device. The target bandwidth band is within a range between any two of the plurality of simulation frequencies.

In an embodiment, the reference information is obtained by simulation of a computer program or obtained by a simulation of a mechanism arrangement.

In an embodiment, the second data of the target information is a difference of two frequencies detected by the signal receiver at two different time.

In an embodiment, the features of the imaginary defect are positions and/or sizes, and the positions and/or sizes of the features of the real defect are determined after the target information is compared with the reference information.

It is known from the above that in the detection system and the detection method according to the present disclosure, the sound source device introduces a sound into the target object actively. The frequency of the sound is in a range such that the sound can form a standing wave sound field in water, air or other fluid in the accommodating space to actuate a resonant sound wave. Therefore, a defect can be detected as the resonant frequency changes, and features of a real defect can be determined by comparing the target information with the reference information.

BRIEF DESCRIPTION OF DRAWINGS

The disclosure can be more fully understood by reading the following detailed description of the embodiments, with reference made to the accompanying drawings, wherein:

FIG. 4B-1 shows the installation process of the database of the detection system according to the present disclosure;

FIGS. 4B-2 and 4B-3 show the results of capturing the frequency data of a pipeline to be detected according to the present disclosure;

FIG. 4C-1 shows a second aspect of first data of reference information of the database of the detection system according to the present disclosure;

FIG. 4C-2 is another form of FIG. 4C-1;

DETAILED DESCRIPTION

Figure 1:
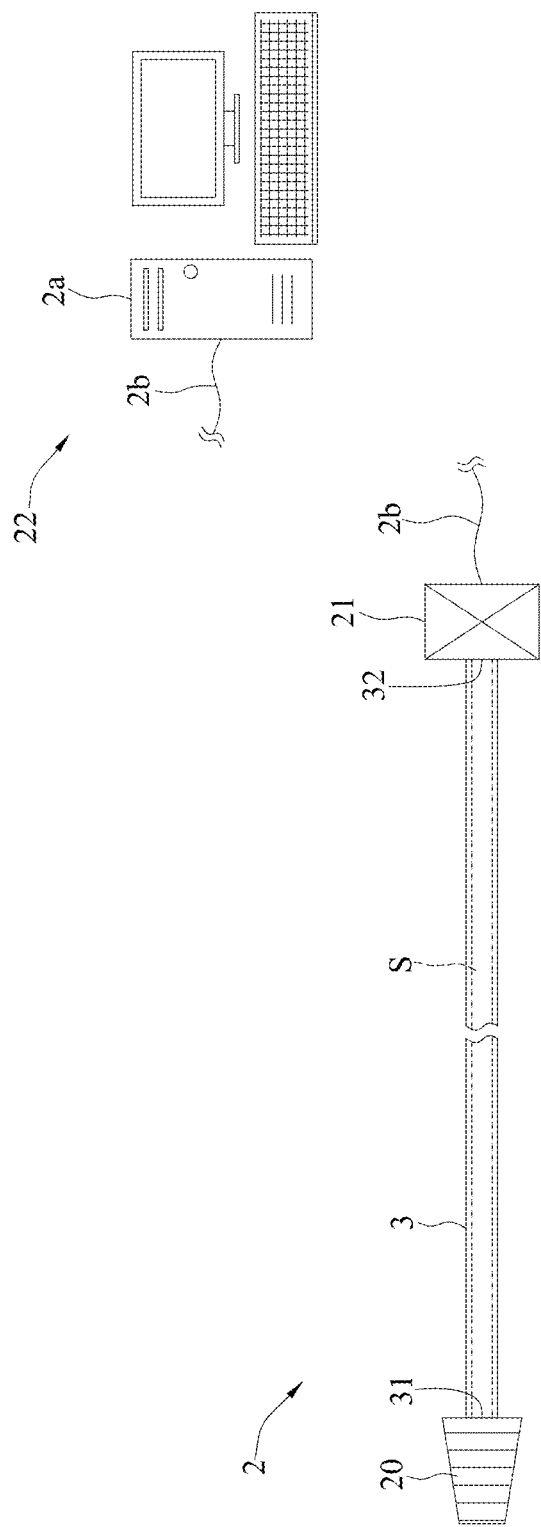
FIG. 1 shows an arrangement of components of a detection system according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows an arrangement of components of a detection system 2 according to the present disclosure. The detection system 2 comprises a sound source device 20, a signal receiver 21 and a database 22.

Figure 2A:
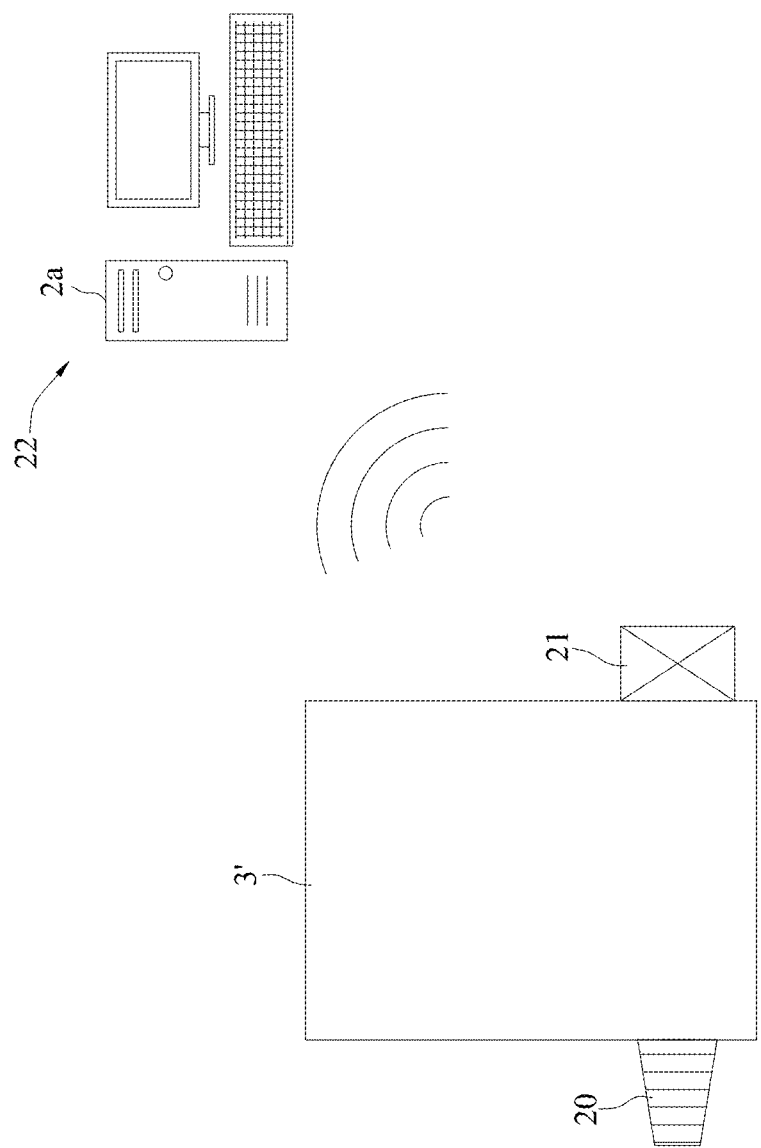
FIG. 2A is another aspect of a target object of FIG. 1.
Figure 2B:
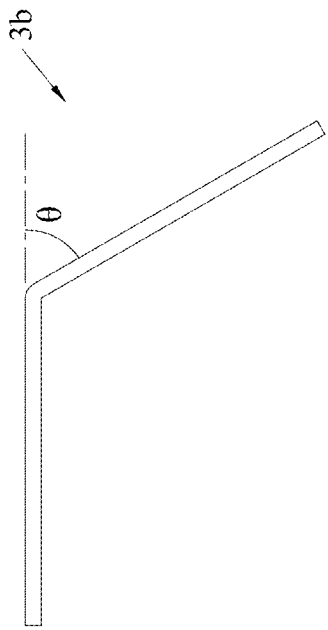
FIGS. 2B to 2F are top views of different aspects of the target object of FIG. 2A.
Figure 2C:
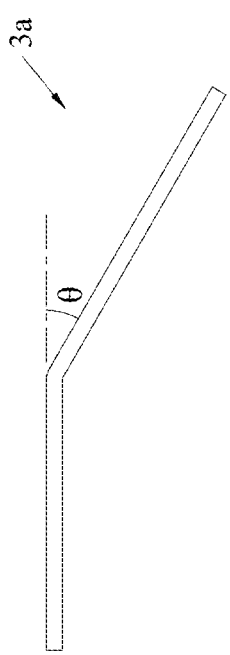
Figure 2D:
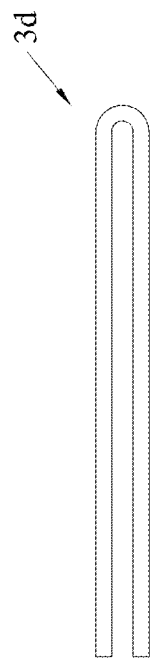
Figure 2E:
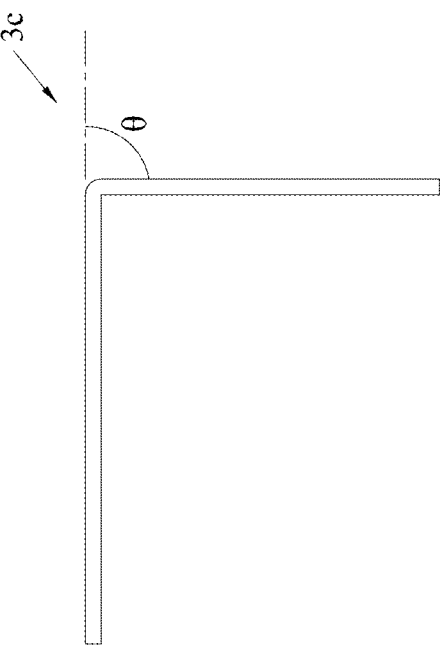
Figure 2F:
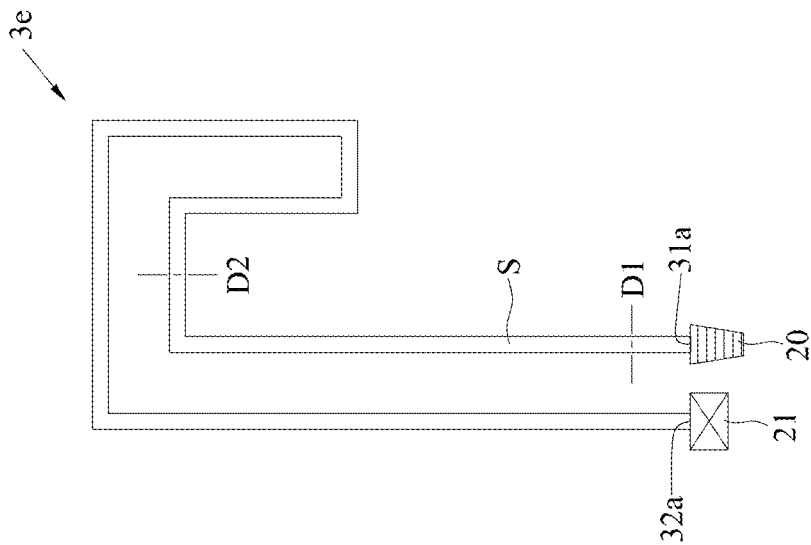

In an embodiment, the detection system 2 is used for detecting a defect of a target object 3, and the target object 3 has an accommodating space S, and a first port 31 and a second port 32 on the accommodating space S. In an embodiment, the target object 3 is a pipeline (as shown in FIG. 2A), a cavity (e.g., a target object 3' shown in FIG. 2A), or a combination thereof. The accommodating space S may be closed or open for containing gas or fluid. In an embodiment, the pipe-shaped target objects 3a, 3b, 3c, 3d and 3e can be straight pipes, curved pipes, or a combination thereof. In an embodiment, the curved pipes can have an included angle 30°, 60°, 90°, 180° or other degree θ as shown in FIGS. 2B-2E respectively, or be a combinational pipeline as shown in FIG. 2F. In an embodiment, the cavity-shaped target object 3' can be a chemical trough, gas chamber, or other cavity having a confined space, or other structures.

The sound source device 20 is disposed at the first port 31 for providing and inputting a sound through the first port 31 into the accommodating space S to generate a resonant sound wave.

In an embodiment, the sound source device 20 is a sound transmitter, such as a speaker, a wireless (Bluetooth) sound transmitter, a wired ultrasonic transmitter, etc., which can provide sounds of different frequencies and/or sounds of different volumes.

Figure 3:
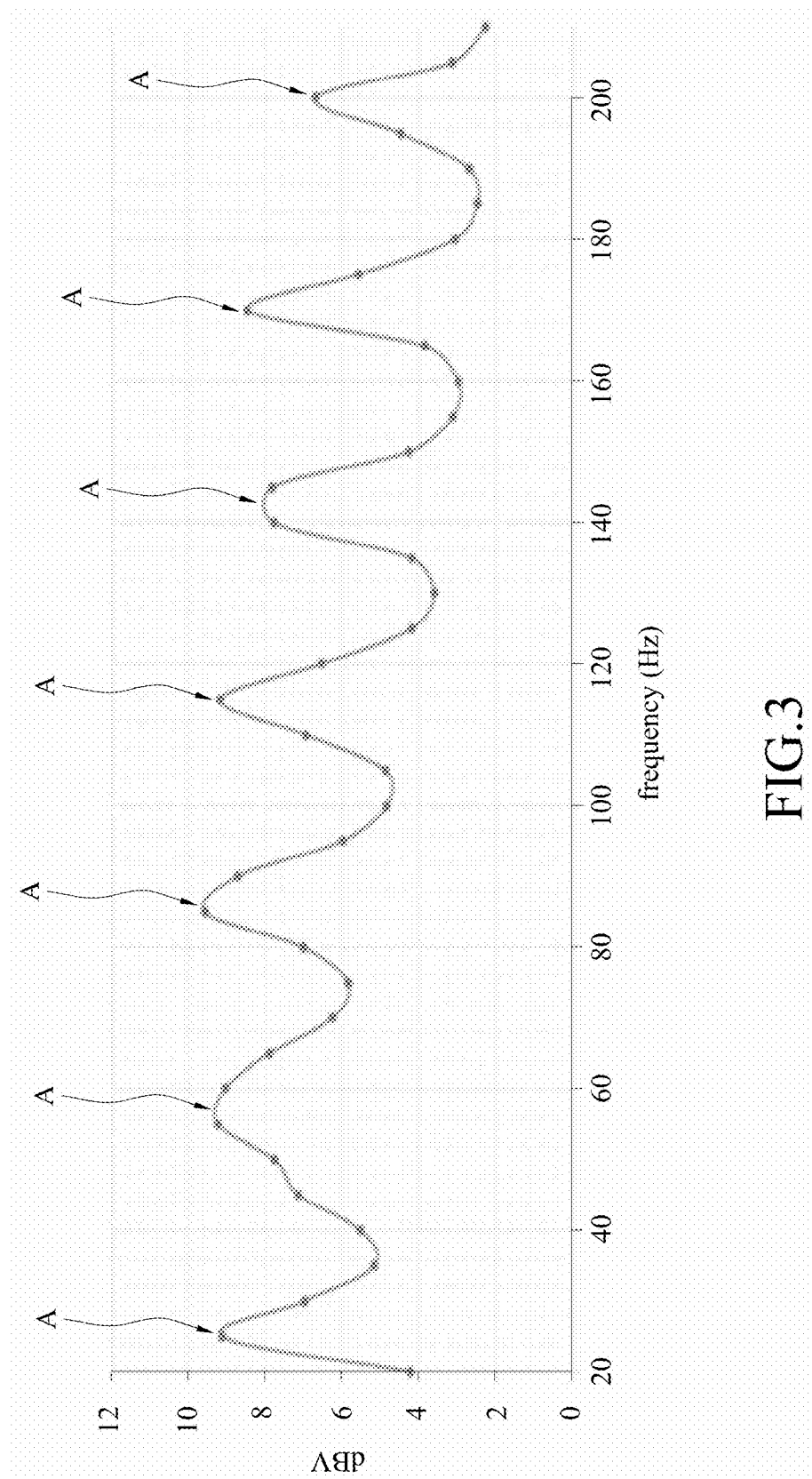
FIG. 3 shows a sound wave generated by a sound source device and measured by a detection system according to the present disclosure.

The resonant sound wave is in a standing wave state in the accommodating space S. An example of a sound wave capturing diagram is shown in FIG. 3, which is actually measured from an original pipeline. (The signal receiver 21 receives a signal at the second port 32). FIG. 3 shows a relation between frequencies and sound pressures before any defect or fracture occurs in the accommodating space S (normal state). A peak positioned at A is a standing wave frequency. The unit dBV on the vertical axis shown in FIG. 3 is a unit of sound pressures in a sound system. The unit dBV is obtained based on an equation $20 \log(V_t/V_0)$, where $V_t$ is a measured voltage value, $V_0$ is a designated reference voltage, and the unit dBV is defined by taking one volt as a standard dB value, i.e., $V_0$ equals to one volt (V).

As shown in FIG. 1, the database 22 stores reference information. The reference information derives from simulation of signals before and after the signal receiver 21 receives the resonant sound wave. The reference information includes first data having characteristics of the resonant sound wave and data having features of an imaginary defect (e.g., positions and/or sizes) formed on the target object 3.

In an embodiment, the first data includes frequency shifts of sound pressures or amplitudes of the resonant sound wave scanned at each frequency in a normal state (no imaginary defect) or a shift state (having an imaginary defect). The imaginary defect is defined as an opening on a body of the target object 3, such as a hole, an aperture, a fissure, etc. on the accommodating space S. And the features of the imaginary defect will affect and correspond to the characteristics of the resonant sound wave. The features of each type of imaginary defect will generate a specific first data. Specifically, the relationship between the first data of the reference information and the features of the imaginary defect is determined on the following Table 1.

TABLE 1

|  | The first aspect of the first data | The second aspect of the first data |
| --- | --- | --- |
| imaginary defect | no features of the imaginary defect | With features of the imaginary defect |

Before each pipeline (e.g., the target objects 3 and 3a-3e shown in FIGS. 1 and 2B to 2F) or each trough (e.g., the target object 3' shown in FIG. 2A) is detected, a database 22 has to be established. In an embodiment, the database 22 stores the reference information. The reference information includes standing wave frequencies when various pipelines or troughs have defects or holes of different sizes and at different positions (i.e., a shift state, a second aspect of the first data). The reference information also includes standing wave frequencies when the pipelines or the troughs do not have defects or holes of different sizes and at different positions (i.e., a normal state, a first aspect of the first data). Further, the reference information includes a frequency spectrum of frequency shifts between the second aspect of the first data and the first aspect of the first data. In the frequency spectrum of frequency shifts, each point represents a frequency shift of a case (or a mode) at each standing wave frequency.

FIG. 3 (standing wave sound field data) is obtained by an actual scanning process that has to be performed when the database 22 is established initially. FIG. 3 shows a relation between frequencies and sound pressures of the accommodating space S before any defect or fissure is formed (normal state). The purpose of FIG. 3 is to define the standing wave frequencies of the detection system 2. In FIG. 3, where the peaks positioned at A are the standing wave frequencies of the detection system 1. The scanning process can be performed continuously based on a frequency bandwidth needed for diagnosis (not limited to low frequency band), such as 2 KHz, 5 KHz or even as high as over a supersonic band of 20 KHz. During the establishment of the database 22, as described in FIG. 4A, the frequency data of a variety of pipelines can be obtained by a simulation method, and the simulation data can be verified, compared and adjusted by comparing the pipelines on the scene (or the actual standing wave frequency of FIG. 3).

Figure 4A:
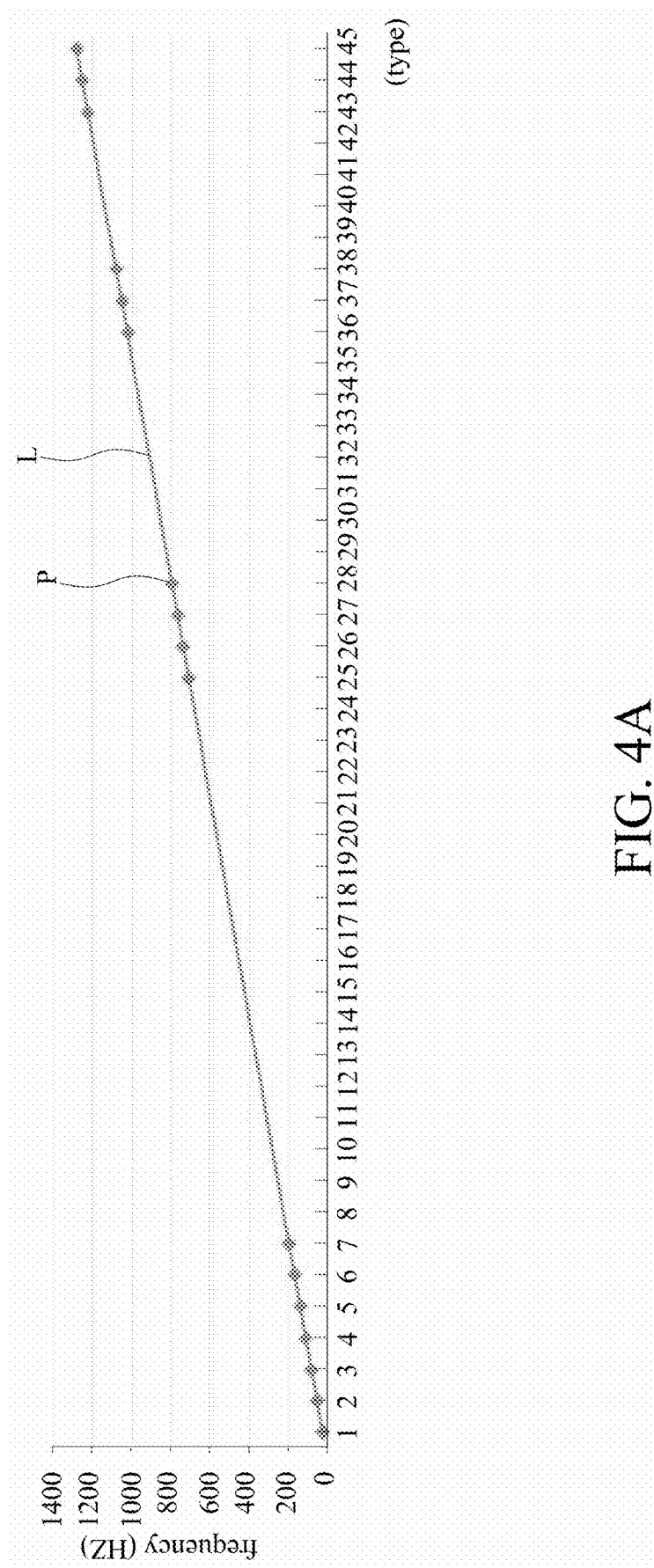
FIG. 4A shows how a simulation program is selected during an installation process of a database of a detection system according to the present disclosure.
Figures 1, 4B:
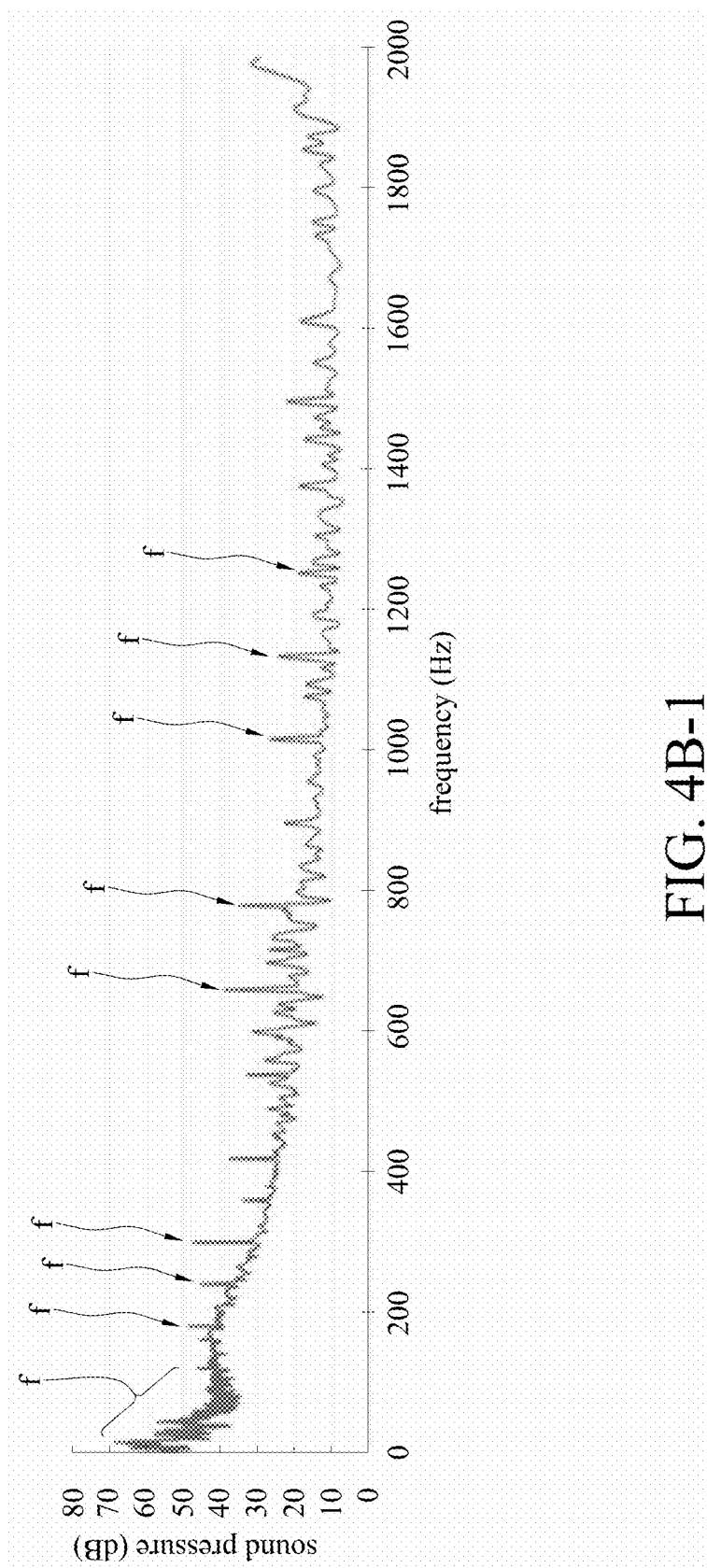
Figures 2, 4B:
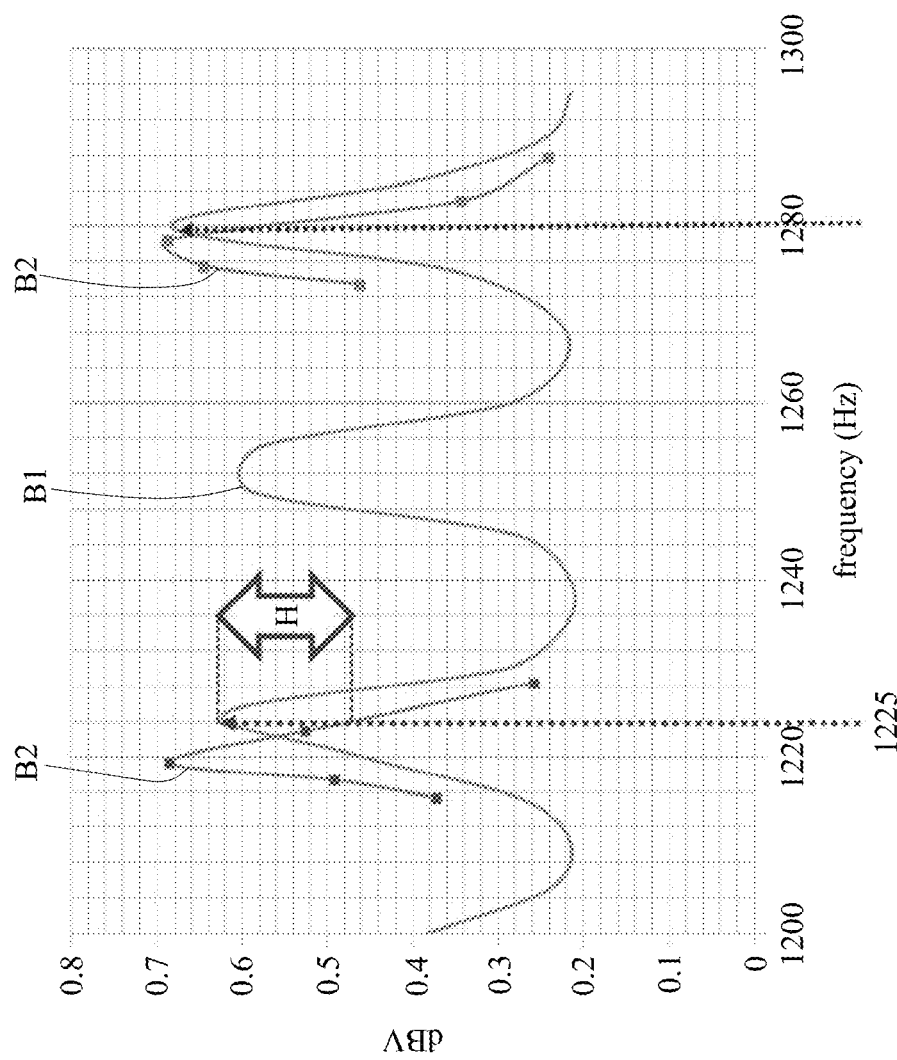
Figures 3, 4B:
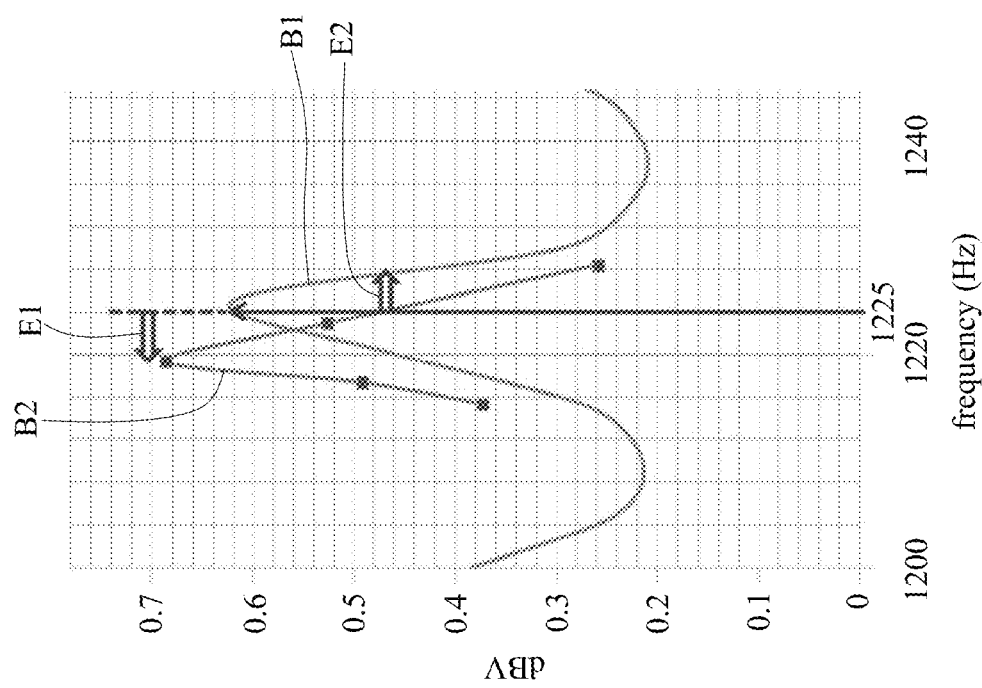
Figures 1, 4C:
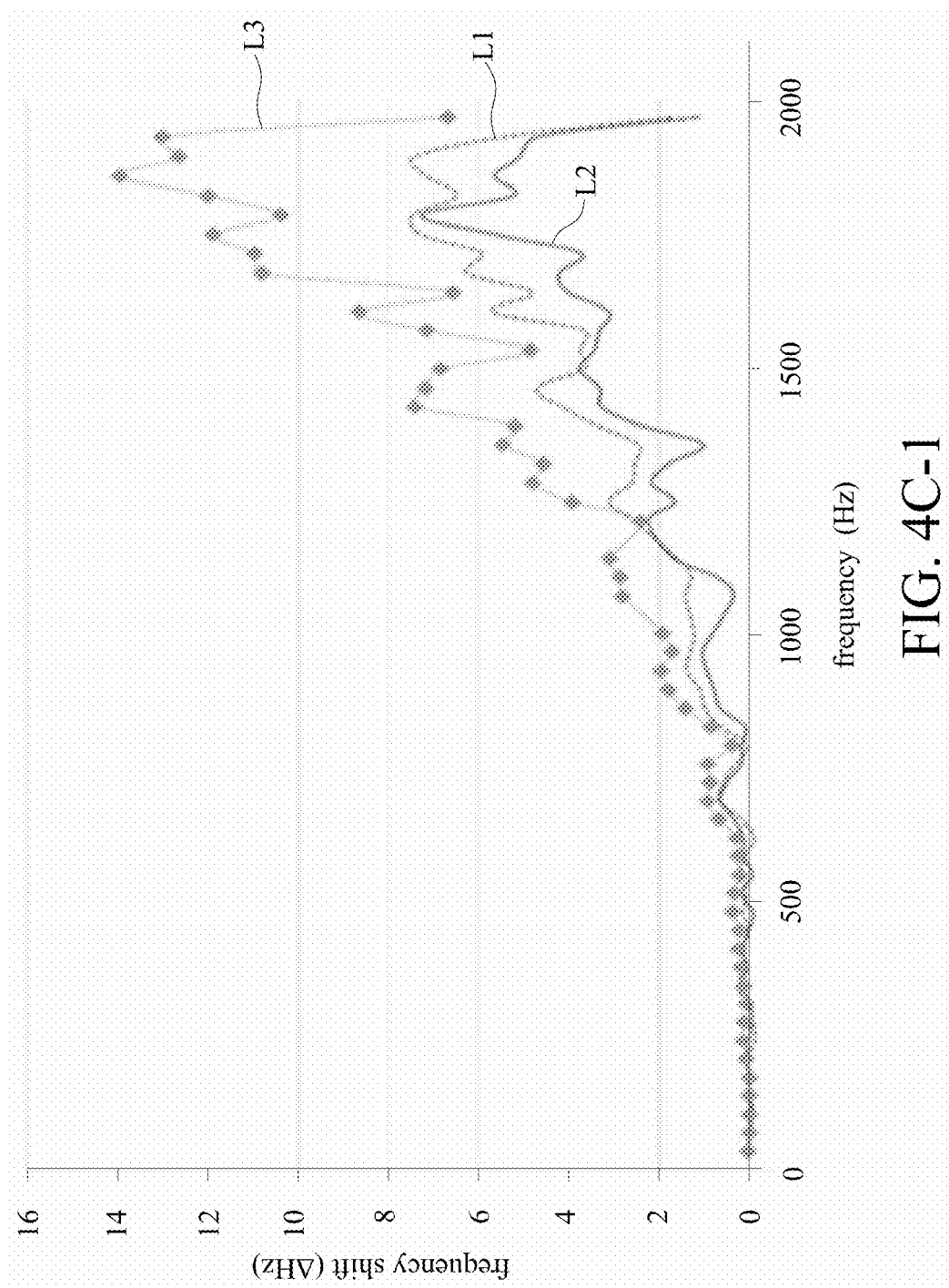
Figures 2, 4C:
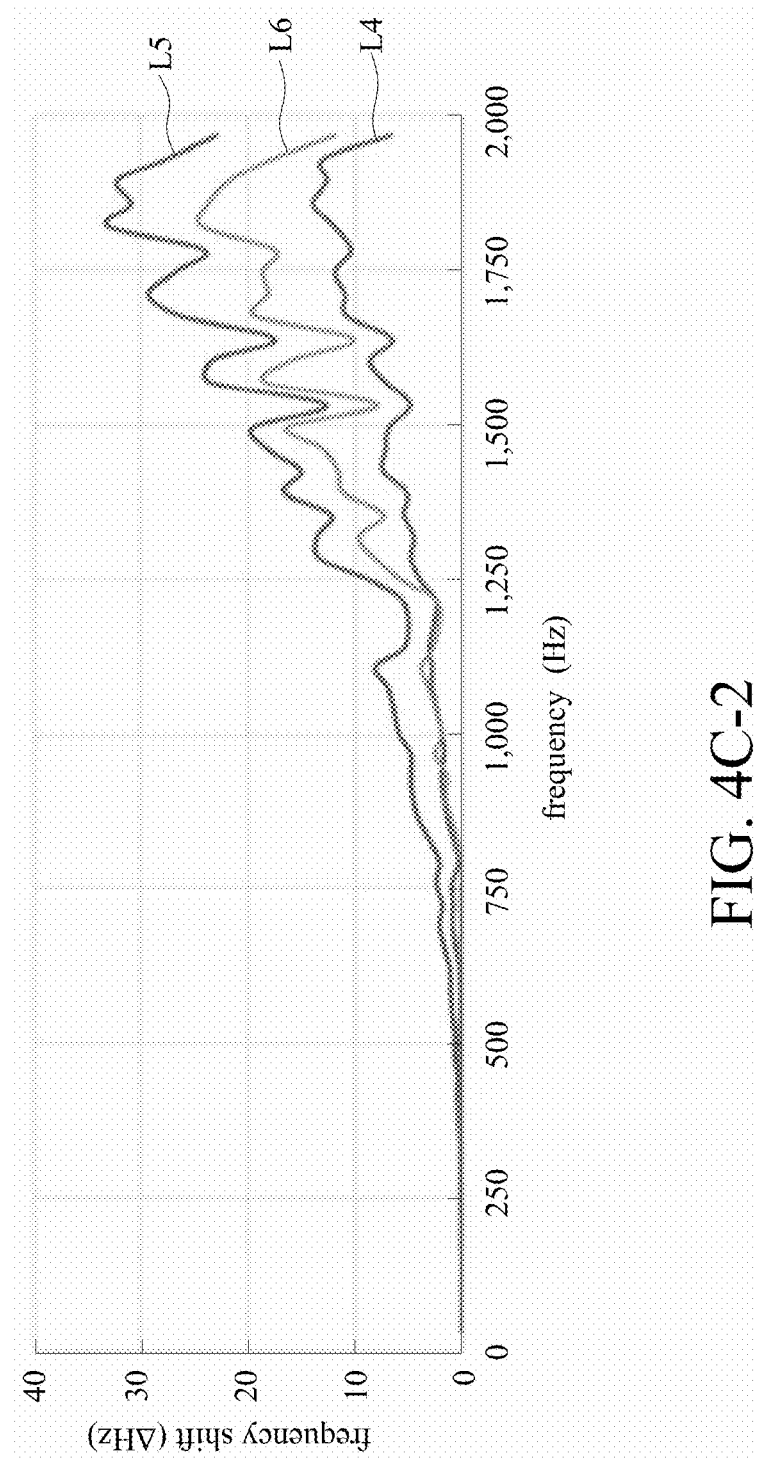

In addition to FIG. 3 and FIG. 4A, the database 22 further includes the frequency data when the pipeline or trough has an imaginary defect or an imaginary hole (e.g., the second aspect of the first data), such as FIG. 4C-1 and FIG. 4C-2. FIG. 4B-1 shows a curve plot measured at a certain position (extending from the first port 31 for 50 meters) in the normal state (no defect), and is obtained by a simulation method. FIG. 4C-1 shows a frequency shift at each position before and after an imaginary hole appears. FIG. 4C-2 shows a frequency shift at the same position before and after imaginary holes of different radiuses appear. FIG. 4C-1 and FIG. 4C-2 are also obtained by a simulation method.

In an embodiment, as shown in FIG. 1 the database 22 is disposed in a host computer 2a, a cloud server or other electronic devices. Before measuring any defect on the actual pipeline on the scene, the database 22 has to be established in advance.

The reference information is obtained by simulation of a computer program. As shown in FIG. 1, the arrangement information (e.g., a virtual model) of a pipeline or trough to be detected is imported into the host computer 2a. The host computer 2a simulates the characteristics of the resonant sound wave of the pipeline or the trough in the normal state. The host computer 2a simulates the characteristics of the resonant sound wave when an imaginary defect is formed, or other related data (e.g., the features of the imaginary defect), as shown in FIGS. 4A, 4B-1, 4C-1 and 4C-2. The reference information can also be obtained by simulation of a mechanism arrangement and association with measurement instrument, as shown in FIG. 2F. The arrangement of the pipeline or the trough on the scene is simulated or another pipeline or trough the same as the pipeline or the trough is assembled or built. The host computer 2a simulates or the measurement instrument measures the characteristics of the resonant sound wave when the pipeline or the trough on the scene is in the normal state. Or the host computer 2a simulates the characteristics of the resonant sound wave when an imaginary defect is formed, or related information (e.g., the features of the imaginary defect). In an embodiment, the pipeline can have actual holes formed at different positions and of different sizes, to establish the characteristics of the resonant sound wave and related information as an actual defect appears. By using simulation and measurement, the database 22 and the reference information are established.

Referring to FIG. 4A, since there are a variety of computer programs, in order to select a better match of simulation program, the reference information calculated by the computer programs (e.g., a first simulation program, a second simulation program . . . and an Nth simulation program) can be compared with the reference information derived by other ways. The reference information could be measured and obtained by the mechanism arrangement (which imitates the pipeline on the scene or original pipeline to be detected itself) and the measurement instrument. By comparison of simulation with measurement, a better matched simulation program is selected in order to ensure the simulation accuracy of the computer program. In each model (i.e., each aspect of the pipeline or trough to be detected, as shown in FIGS. 1 to 2F, the aspects being numbered as nos. 1-45 shown in FIG. 4A), the characteristics of the resonant sound wave obtained at the same volume (dB unit) are over 95% of similarity, which is almost fitted. In an embodiment, the frequencies measured by the mechanism arrangement imitating the pipeline on the scene (or original pipeline to be detected itself) and measured by the measurement instrument at the second port 32 (e.g., the points P of modes 1, 2, 3, 4, 5, 6, 7, 25, 26, 27, 28, 36, 37, 38, 43, 44 and 45 shown in FIG. 4A) are overlapped or well fitted to the frequencies calculated by one computer program (e.g., the first simulation program) simulating signals received at the second port 32 (e.g., a slope line L shown in FIG. 4A). The computer program (e.g., the first simulation program) can be selected as the simulation program of the host computer 2a, which can be used for establishing the reference information of the database 22 subsequently.

In an embodiment, the characteristics of the resonant sound wave are referred to as strength or a frequency shift. When the sound source device 20 provides sounds of different frequencies, the strength (or sound pressure) of sounds received at different positions along a path between the first port 31 and the second port 32 are different. FIG. 4B-1 shows a portion of contents in the database 22, and is a curve plot of the frequency of the returned waves received at a position (e.g., a position extending from the first port 31 for 50 meters, or a position at the second port 32) when a normal state (no defect) is simulated, which can also be represented by tables (e.g., the following two tables). FIG. 4B-1 and Tables 2 and 3 all belong to a portion of the calculation process of the database 20 and to the first aspect of the first data, but do not have information about the features of the imaginary defect, thereby establishing the first aspect of the first data of the reference information of the database 22.

TABLE 2

A position extending from the first port 31 for nine centimeters

| Output frequency (Hz) | Sound pressure (dB) |
|---|---|
| 70 | 149.25 |
| 140 | 150.52 |
| 210 | 143.67 |
| 280 | 142.69 |
| 350 | 135.92 |
| 420 | 147.51 |

TABLE 3

A position extending from the first port 31 for 200 meters

| Output frequency (Hz) | Sound pressure (dB) |
|---|---|
| 70 | 76.12 |
| 140 | 74.31 |
| 210 | 70.36 |
| 280 | 74.3 |
| 350 | 67.42 |

In a case in which the target object 3 has imaginary defects of the same sizes, when the imaginary defects occur at different positions, the curve shown in FIG. 4B-1 changes or shifts. In a standing wave sound field, the hole will result in the frequency shift (i.e., the frequency increases or decreases). Therefore, the frequencies simulated at different positions in the accommodating space S will change. A difference between the changed frequency (after the hole is formed) and the original frequency (before any hole is formed) is taken as a frequency shift, so as to obtain the curve plot of the frequency shift of the pipeline at different positions.

The database 22 further constitutes the frequency data having imaginary defects or imaginary holes (the second aspect of the first data). FIG. 4C-1 and FIG. 4C-2 are referred to as the second aspect of the first data. The curve plot of the frequency shift is shown in FIG. 4C-1, where the horizontal axis represents frequencies (Hz), and the vertical axis represents the frequency shift (ΔHz). FIG. 4C-1 is formed by a simulation method, and each point on the curve of FIG. 4C-1 represents a frequency shift (the vertical axis) between a frequency before an imaginary hole is formed and a frequency after the imaginary hole is formed at one frequency (the horizontal axis). In FIG. 4C-1, a dash line L1 is simulated and obtained when a distance between the imaginary defect and the first port 31 is one meter long. The frequencies of the horizontal axis represent the frequencies emitted at the first port 31. At first, a first frequency curve of the returned wave (or propagated wave) received at the second port 32 is measured when no imaginary defect is formed. Then a second frequency curve of the returned wave received at the second port 32 is measured when an imaginary defect is formed. The first frequency curve (no imaginary defect) is subtracted from the second frequency curve (with an imaginary defect) to obtain a dash line L1. A solid line L2 represents a calculation result when a distance between the imaginary defect and the first port 31 is three meters long. A dotted line L3 represents a calculation result when a distance between the imaginary defect and the first port 31 is 4.9 meters long. The frequency ranging 0-2000 Hz of the horizontal axis is emitted at the first port 31. Each point on the curve represents a frequency shift between the frequencies of the returned wave received at the second port 32 before and after a hole is formed. The dash line L1 is taken as an example, in which a data point (1500 Hz, 4 Hz) represents that the first port 31 emits a frequency of 1500 Hz When an imaginary defect is formed at a position away from the first port 31 for one meter long, the frequency of the returned wave received at the second port 32 will bring out a frequency shift of 4 Hz.

Similarly, as shown in FIG. 4C-2, in which the horizontal axis represents frequency (Hz) and the vertical axis represents frequency shift (ΔHz). FIG. 4C-2 employs a simulation method, and each point on the curve represents a frequency shift (the vertical axis) between frequencies before and after an imaginary hole is formed at one frequency (the horizontal axis). The frequency ranging 0-2000 Hz of the horizontal axis is emitted at the first port 31. Each point on the curve is a frequency shift between frequencies of the returned wave (or propagated wave) received at the second port 32 before and after a hole is formed. In a case in which the imaginary defects of the target objects 3 occur at the same position (e.g., a distance between the imaginary defect and the first port 31 is 4.9 meters long). When the imaginary defects have different sizes, a frequency shift will still be obtained. And the curve plot of the sizes of the imaginary defect is thus obtained. Regarding a bottom curve L4 as shown in FIG. 4C-2, frequencies of the horizontal axis represent each frequency emitted at the first port 31. At first, when no imaginary defect is formed, a first frequency curve of the returned wave (or propagated wave) received at the second port 32 is then recorded. When an imaginary hole of 0.5 mm in radius is formed, each frequency emitted at the first port 31 is then measured. The second frequency curve of another returned wave received at the second port 32 is recorded. And the first frequency curve is subtracted from the second frequency curve to obtain the bottom curve L4. A top curve L5 represents a calculation result when an imaginary hole of 1 mm in radius is formed. A middle curve L6 represents a calculation result when an imaginary hole of 2 mm in radius is formed.

FIGS. 4C-1 and 4C-2 belong to a portion of the database 20 after the calculation is complete. FIG. 4C-1 simulates the frequency shifts before and after an imaginary hole is formed at each position. FIG. 4C-2 simulates the frequency shifts before and after imaginary holes of different radii are formed at the same position. In this stage, the second aspect of the first data of the reference information of the database 22 is established.

It should be understood that the first aspect of the first data of the reference information of the database 22 belongs to a normal state, and no frequency shift will be generated.

Therefore, the contents of FIG. 4B-1 and Tables 2 and 3 can act as the first aspect of the first data of the reference information.

After the database 22 is established, the actual pipeline on the scene is measured, to find out the position and size of the actual hole. FIGS. 4B-2 and 4B-3 show the measurement result of the actual pipeline to be detected. The purpose of FIGS. 4B-2 and 4B-3 is to capture the frequency shift (ΔHz). FIGS. 4B-2 and 4B-3 belong to the second data of the target information. FIGS. 4B-2 and 4B-3 show a relation between the frequency and sound pressure actually measured at the same position in a normal state (before a hole is formed) and a shift state (after a hole is formed). And the method of FIG. 3 is employed on FIGS. 4B-2 and 4B-3. During a frequency scanning process, a normal curve B1 will be obtained in a normal state (before an actual hole is formed). A shift curve B2 will be obtained in a shift state (after an actual hole is formed). And a frequency shift occurs between the normal curve B1 and the shift curve B2. As shown in FIG. 4B-3, the frequency shift E1 between two peaks of the normal curve B1 and the shift curve B2 is about 5 Hz. The regional peak in the normal curve B1 is at 1225 Hz, and the regional peak in the shift curve B2 is at 1220 Hz. When detecting by using specific sound frequency (e.g., where the peak is at 1225 Hz), the normal curve B1 and the shift curve B2 will generate a sound volume shift (e.g., a sound volume shift H shown in FIG. 4B-2). And a frequency shift E2 between the normal curve B1 and the shift curve B2 derived from the same sound volume is 5 Hz. As shown in FIG. 4B-3, in the horizontal line of a sound pressure of 0.46 dBV, the frequency of the normal curve B1 is at 1230 Hz, and the frequency of the shift curve B2 is at 1225 Hz. It is thus known that the two frequency shifts E1 and E2 are approximately equal (i.e., E1≈E2). Therefore, the frequency shifts E1 and E2 of the specific sound frequency (1225 Hz) are 5 Hz, and the frequency shift can be estimated by using the strength of the sound wave. FIGS. 4B-2 and 4B-3 belong to the actual measuring process of the pipeline to be detected. The purpose of FIGS. 4B-2 and 4B-3 is to obtain the frequency shift (4 Hz). It is noted that the determination of the frequency shift can be done by a variety of methods, and are not limited to the method described above.

Figure 7A:
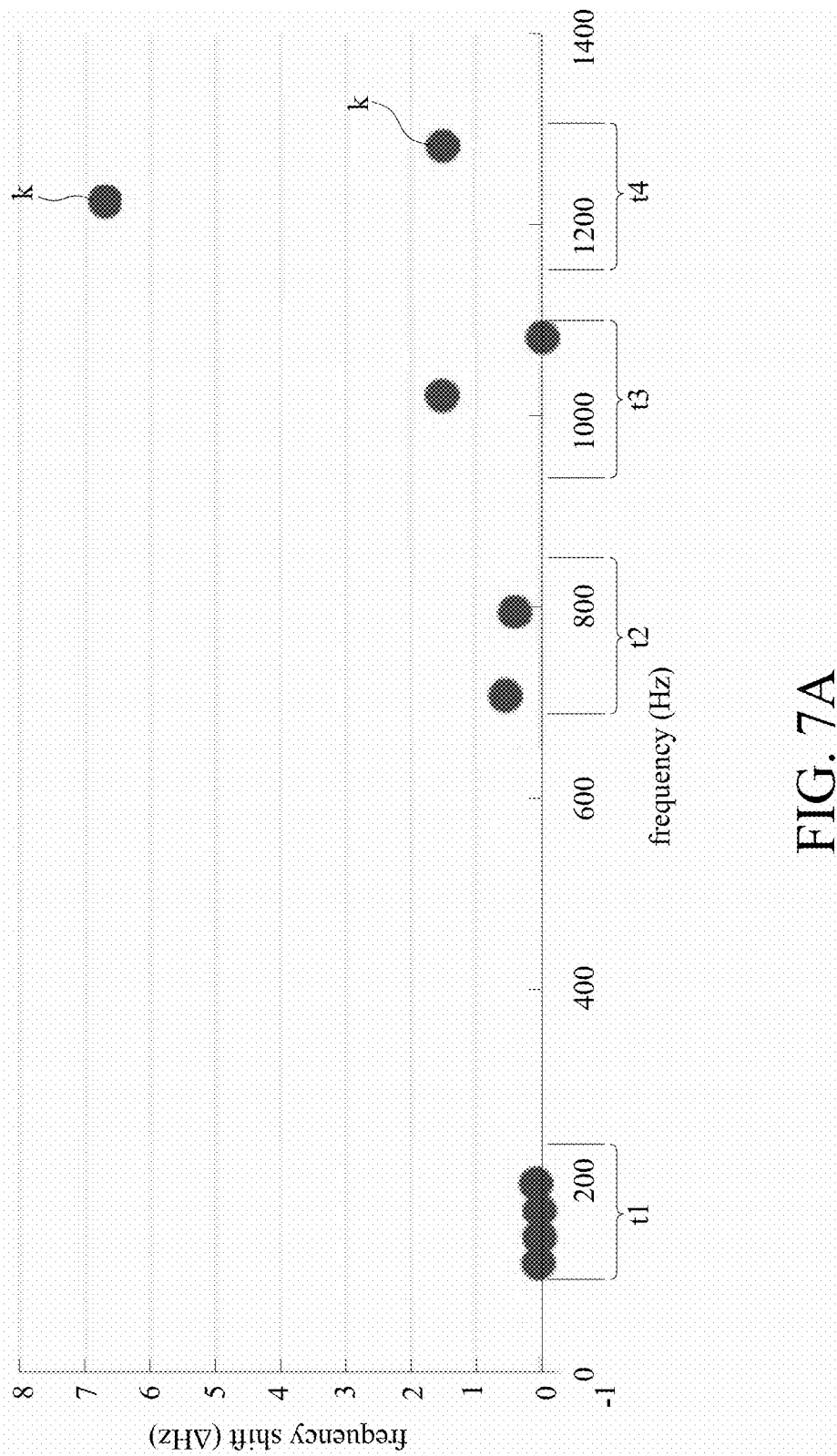
FIG. 7A shows a way illustrating target information of a detection method according to the present disclosure.
Figure 7B:
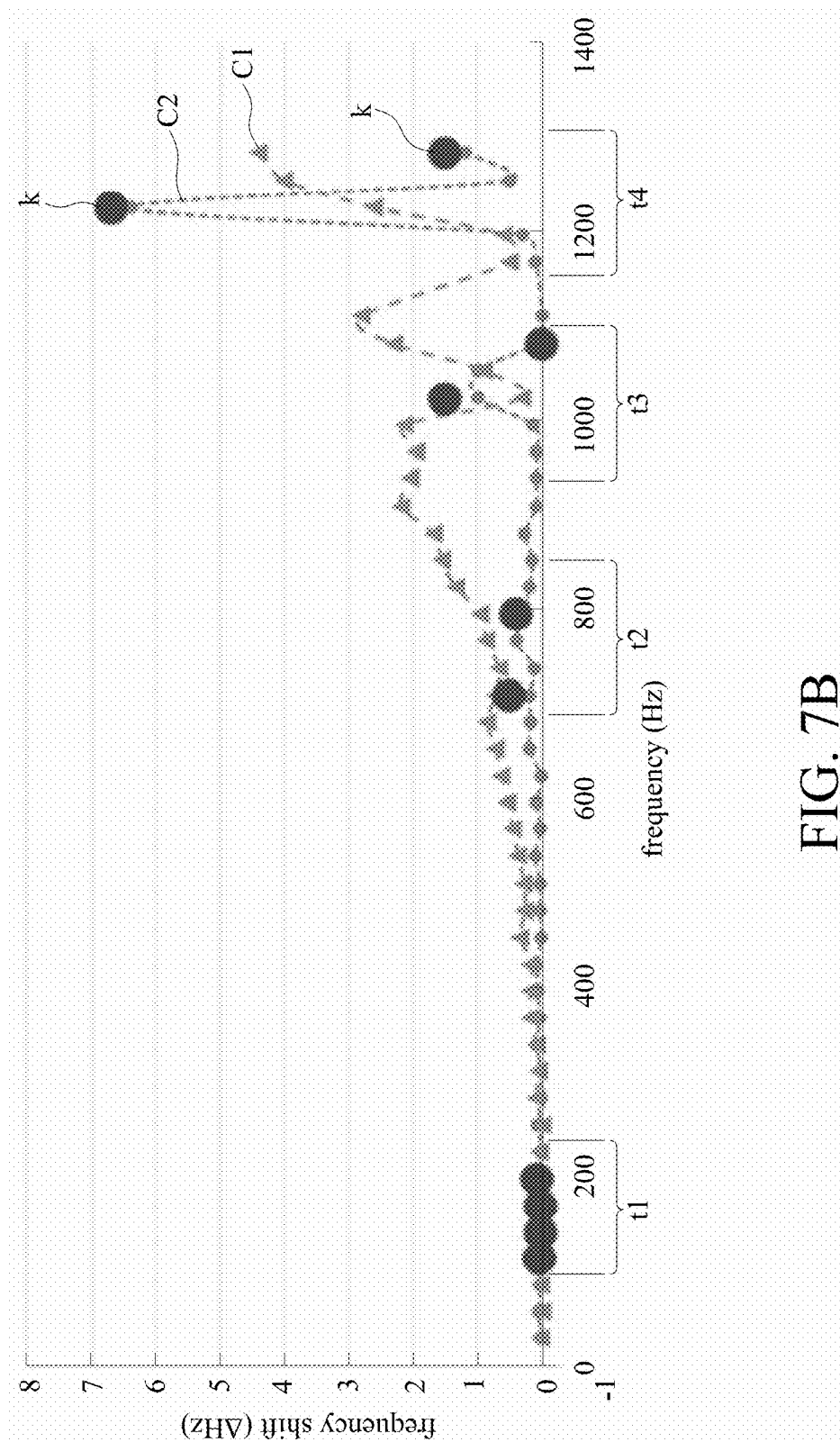
FIG. 7B shows a curve of a comparing result obtained after a comparing process of a detection method is complete according to the present disclosure.
Figure 7C:
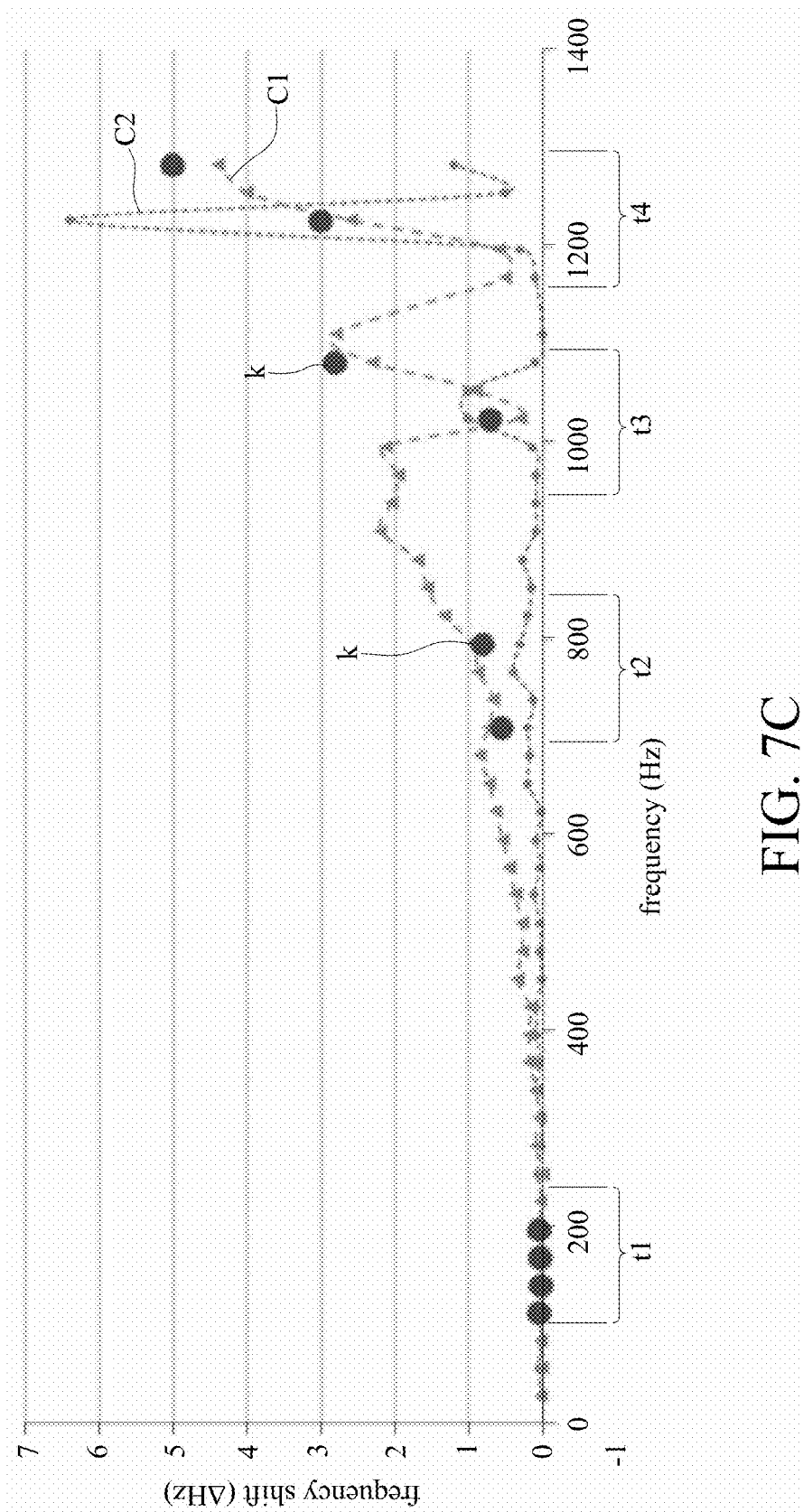
FIG. 7C is another aspect of FIG. 7B.

After the frequency shift (ΔHz) relation of the pipeline to be detected (the second data of the target information) is obtained through FIGS. 4B-2 and 4B-3, the frequency shift (ΔHz) can be summarized as the target point k graph of FIG. 7A. Each target point k is referred to as the frequency shift before and after an actual hole is formed. When a comparing process is performed, the frequency shift (ΔHz) of FIGS. 4B-2 and 4B-3 is compared with FIGS. 4C-1 and 4C-2 of the database 22 (the second aspect of the first data). The actual comparing process is shown in FIGS. 7B and 7C. The position and size of the hole can be found by overlapping the target points k and a curve, as described in the following paragraphs.

As shown in FIGS. 1 and 2A, the signal receiver 21 is disposed at the second port 32 for receiving the resonant sound wave to obtain target information. The target information will be transferred manually (e.g., input to the host computer 2a by a person) or automatically (e.g., by the transmission line 2b shown in FIG. 1 or the wireless transmission shown in FIG. 2A) to the database 22. The target information comprises second data having the characteristics of the resonant sound wave when the target object 3 has a real defect. And the second data is an actual measurement result (e.g., a difference between frequencies obtained at two different time points, which is based on the frequencies of the returned wave (or propagated wave) received at the second port 32 of the signal receiver 21). The second data reflects the real defect and position and size of the actual hole in the accommodating space S.

When the second data of the target information (data relating to the actual measuring contents of the accommodating space S on the scene) is compared with the first data of the reference information (the first aspect and the second aspect), the features of the real defect can be derived from the features of the imaginary defect or the predefined real defect. The real defect is determined as an opening on a body of the target object 3, such as a hole, an aperture, or a fissure, etc. which is on the accommodating space S and external spacing.

During establishment of the database 22, the following figures are obtained. The database 22 comprises FIG. 3, FIG. 4A, FIG. 4B-1, FIG. 4C-1 and FIG. 4C-2. The database 22 has the original frequency data before the pipeline or the through has any defect, as shown in FIG. 3 (which represents data of the standing wave sound field actually measured when the pipeline having no defect). FIG. 4A represents that the frequency data of the pipeline is obtained by a simulation method. FIG. 4B-1 represents that a relation between the strength and the frequency of the resonant sound wave is obtained by a simulation method. The frequency data after the pipeline or the trough has an imaginary defect or imaginary hole, as shown in FIG. 4C-1 (which represents the frequency shifts obtained by simulating frequencies before and after an imaginary hole is formed at different positions). FIG. 4C-2 represents the frequency shifts obtained by simulating frequencies before and after imaginary holes having different radii at the same position.

Figure 5:
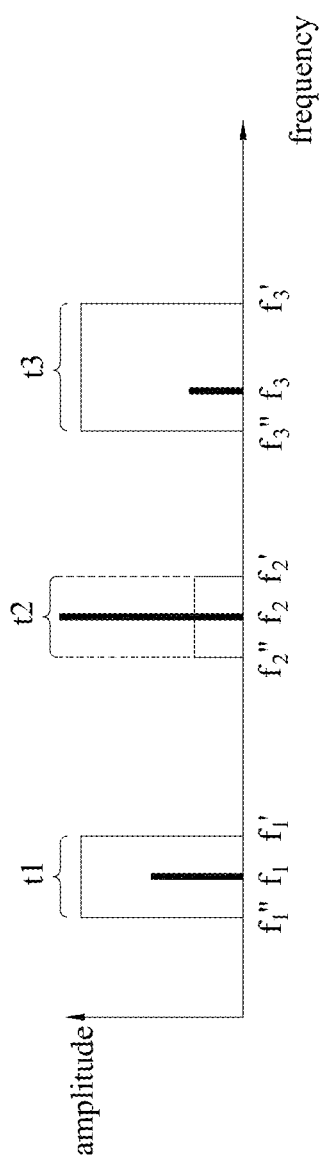
FIG. 5 is a schematic diagram of a target bandwidth band selected when a detection system actually detects according to the present disclosure.

After the database 22 is established, a specific resonant sound frequency will be selected. As shown in FIG. 5, when the process of detecting a defect actually is performed subsequently, an operator introduces a specific sound frequency into the pipeline or trough. The sound wave will form a standing wave in the pipeline or trough. The signal receiver 21 receives frequency and amplitude signals, and a simplified calculation method is used to obtain the second data (described as follows).

In an embodiment, in the process of selecting the specific resonant sound frequency, the characteristics of the resonant sound wave (its source) in the reference information derives from the sounds of a plurality of simulation frequencies provided by the sound source device 20 (e.g., the frequency of 0-2000 Hz shown in FIG. 4B-1). And the characteristics of the resonant sound wave (its source) in the target information come from the sounds of the target bandwidth bands t1, t2 and t3 provided by the sound source device 20 (as shown in FIG. 5). The target bandwidth bands t1, t2 and t3 are defined based on an interval between any two of the simulation frequencies. The target bandwidth bands t1, t2 and t3 encompass resonant frequencies $f_1$, $f_2$ and $f_3$. In an embodiment, at least one frequency where the sound pressure changes severely is taken as a standard (e.g., in the nine frequencies f in the curve shown in FIG. 4B-1, the frequency f has a higher sound pressure regionally). And intervals between frequencies $f_1'$, $f_2'$ and $f_3'$ (upper limit), which are slightly higher than the standard, and frequencies $f_1''$, $f_2''$ and $f_3''$ (lower limit), which are slightly lower than the standard, is taken as the target bandwidth bands t1, t2 and t3, as shown in FIG. 5.

Since where the sound pressure changes severely can apparently reflect the characteristics of the resonant sound wave, frequencies neighboring the regional peaks where the sound pressure changes severely is taken as a range of the target bandwidth bands t1, t2 and t3. As the detection system 2 is in operation, the sound source device 20 is enabled to emit at least one frequency within the target bandwidth bands t1, t2 and t3 (e.g., the frequency f shown in FIG. 4B-1 or the frequencies $f_1$, $f_2$ and $f_3$ shown in FIG. 5). And the host computer 2a receives target information that can be compared with the reference information effectively, without having to enable the sound source device 20 to emit all the simulation frequencies in the reference information.

Figure 6:
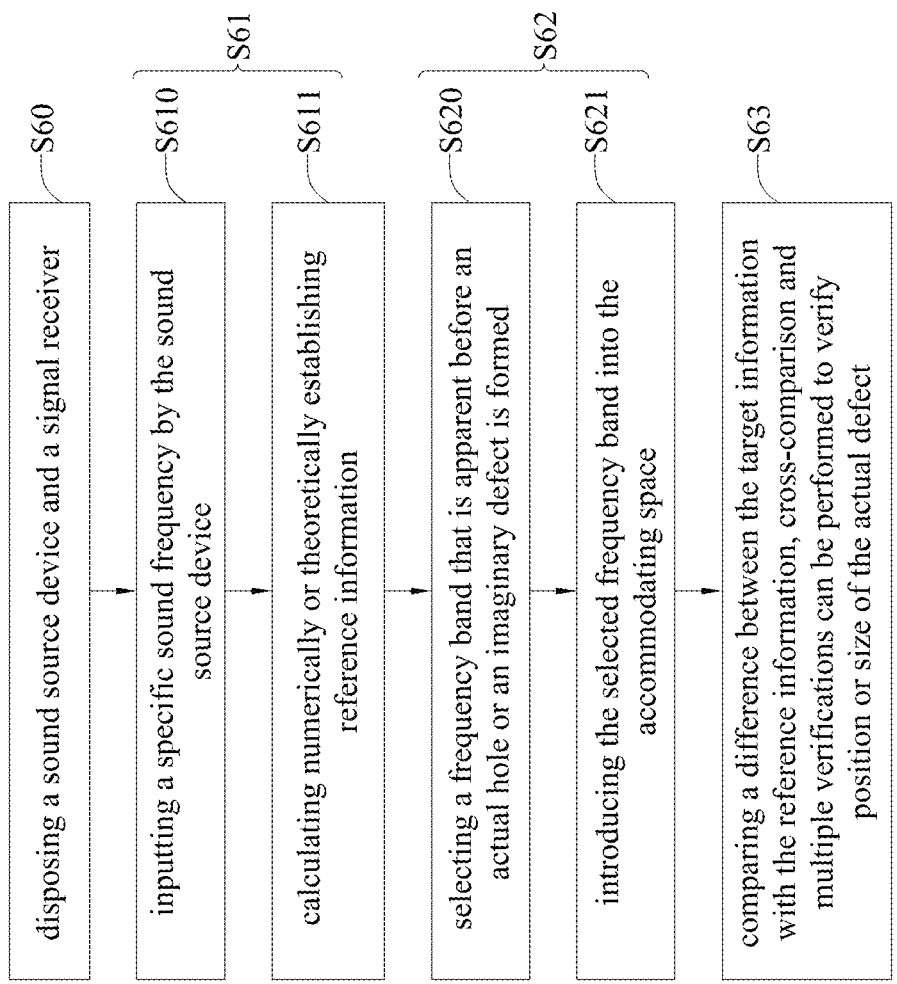
FIG. 6 is a flow chart of a detection method according to the present disclosure.

FIG. 6 is a flow chart of a method for detecting a defect according to the present disclosure. In an embodiment, the detection system 2 is employed to actually detect whether the target object 3 has any defect and the corresponding features of the defect.

In step S60, based on the pipeline arrangement of FIG. 2F, the sound source device 20 is disposed at the first port 31a of the target object 3e. And the signal receiver 21 is disposed at the second port 32a. It can be understood that the target object can employ another aspect.

In step S61, the reference information of the database 22 is established. In step S610, the sound source device 20 introduces sounds of a specific sound frequency (e.g., the target bandwidth bands t1, t2 and t3 shown in FIG. 5) via the first port 31a into the accommodating space S. As a result, the resonant sound wave is generated in the accommodating space S. In step S611, a computer program is used to simulate (calculating numerically or theoretically) signals generated after the resonant sound wave is received by the signal receiver 21, to establish the reference information. The reference information comprises the first data having the characteristics of the resonant sound wave and the data having the imaginary defect of different positions or sizes formed on the target object 3e. The position (or size) of the imaginary defect corresponds to the second aspect of the first data (or the characteristics of the resonant sound wave). The first data not only comprises corresponding contents of simulation after the imaginary defect is formed on the target object 3e (belonging to the second aspect), but also the first data further comprises corresponding contents of simulation before the imaginary defect is formed on the target object 3e (belonging to the first aspect). In step S611, FIG. 3, FIG. 4A, FIG. 4B-1, FIG. 4C-1, and FIG. 4C-2 are generated. FIG. 3 represents that data of the standing wave sound field when the pipeline having no detect is measured actually. FIG. 4A represents that the frequency data of the pipeline is obtained by a simulation method. FIG. 4B-1 represents that a relation between the strength and frequency of the resonant sound wave is obtained by a simulation method. And the frequency data when the pipeline or trough has an imaginary defect or an imaginary hole, as shown in FIG. 4C-1 (the frequency shift obtained by simulating frequencies before and after an imaginary hole is formed at different positions). FIG. 4C-2 represents that the frequency shift obtained by simulating frequencies before and after imaginary holes having different radii at the same position are formed. Step S611 is equivalent to the establishing stage of the database 22.

In an embodiment, a specific sound frequency and sound volume can be selected based on a result of scanning frequencies (i.e., simulating the global bandwidth). And the scanning frequencies are used for the reference information, such as the frequencies f and the sound volume 0-80 dB shown in FIG. 4B-1. In another embodiment, the best detecting frequency range can be selected based on object length or object type (e.g., the target object 3a-3e shown in FIGS. 2B to 2F), such as the target bandwidth bands t1, t2 and t3 shown in FIG. 5.

In step S62, when performing a detection process periodically, an operator actually detects whether the target object 3e has any defect. In step S620, a frequency band, in which the frequencies change severely or which is apparent before an actual hole or an imaginary defect is formed, is selected. That is, at least one frequency band within the target bandwidth bands t1, t2 and t3 is selected (e.g., the frequencies f shown in FIG. 4B-1 or the frequencies $f_1$, $f_2$ and $f_3$ shown in FIG. 5). In step S621, the sound source device 20 actively emits and introduces the sounds at the frequency band within the selected target bandwidth bands t1, t2 and t3 (e.g., having the frequencies f shown in FIG. 4B-1 or the frequencies $f_1$, $f_2$ and $f_3$ shown in FIG. 5), and inputs the sounds via the first port 31a into the accommodating space S.

In an embodiment, an operator can select the best frequency band and energy for emitting sound waves based on the frequency signals actually detected by the signal receiver 21. That is, the sounds at the frequencies f shown in FIG. 4B-1 and the frequencies $f_1$, $f_2$ and $f_3$ shown in FIG. 5 are selected. The sound source device 20 is enabled to introduce specific frequency bands into the target object 3e and the signal receiver 21 receives sound data.

In step S63, the sound data received by signal receiver 21 are analyzed and processed. The difference between the target information and the reference information is compared. Cross-comparison and multiple verifications can be performed to verify position or size of the actual defect. The signal receiver 21 will obtain target information when the second port 32a receives the resonant sound wave. The target information comprises second data having the characteristics of the resonant sound wave (a result of measuring the object to be detected actually). The second data of the target information by the signal receiver 21 is compared with the first data of the reference information of the database 22. The second data reflects the real defect and actual hole of the accommodating space S and their positions and sizes. In the embodiment of step S63, after the frequency shift (ΔHz) relation (the second data of the target information) of the pipeline to be detected is obtained from FIGS. 4B-2 and 4B-3, the frequency shift (ΔHz) can be summarized as the target point k graph of FIG. 7A. And each target point k is derived from the frequency shift before and after an actual hole is formed. When the comparing process starts, the frequency shift (ΔHz) of FIGS. 4B-2 and 4B-3 is compared with FIGS. 4C-1 and 4C-2 of the database 22 (the second aspect of the first data). The actual comparing process is shown in FIGS. 7B and 7C, by overlapping the target point k with the frequency curve, in order to find the position and size of the actual hole.

If the target object 3e does not have any defect (the strength of the sound wave does not change), the receiving signals (frequency) received by the signal receiver 21 at any time do not change. For instance, if the frequency detected three days ago is the same as the frequency detected today, an operator does not need to perform the comparing process. It can be understood that the contents (data) transmitted into the database 22 are approximately equivalent to the first data of the reference information of the database 22 before forming the imaginary defect on the target object 3e (a normal state or having no imaginary defect, also referring to the first aspect of the first data). And the resonant sound wave does not have any frequency change at each position of the pipeline.

If the target object 3e has a real defect, the strength of the sound wave changes and the frequency shift occurs, as shown in FIGS. 4B-2 and 4B-3. FIGS. 4B-2 and 4B-3 are curves of frequency shift before and after the pipeline to be detected has an actual hole, respectively). When the sound source device 20 is enabled to introduce at least one frequency band in the target bandwidth band t4 into the accommodating space S, the received signals (frequency) received by the signal receiver 21 at two different time will change. The frequency signals actually detected by the signal receiver 21 are calculated to obtain the second data of the target information (e.g., the target point k), as shown in FIG. 7A. For instance, the frequencies detected three days ago (e.g., 1200 Hz) and today (e.g., 1193.2 Hz) by the signal receiver 21 are different. One of the frequencies is subtracted from the other so as to obtain a target point k (e.g., a frequency shift 6.8 Hz). The target point k is used as the contents of the second data of the target information. The contents (target points k) are then transmitted into the database 22 for comparison. The contents (target points k) are approximately equivalent or fitted to the second aspect of the first data of the reference information of the database 22. The second aspect of the first data is a simulated content after the imaginary defect is formed on the target object 3e. Therefore, based on the position (e.g., the frequency shift shown in FIG. 4C-1) and/or size (e.g., the frequency shift shown in FIG. 4C-2) of the imaginary defect corresponding to the second aspect of the first data of the reference information of the database 22, the position and/or size of the real defect of the target object 3e now (today) can be known. The definitions in a following summary Table 4 is related to the reference information and the target information.

of the imaginary defect that is at 1.5 meters (the features of the known imaginary defect, the second aspect of the first data). Therefore, when the target point k of the second data of the target information measured by the signal receiver 21 overlaps the second curve C2, the position of the real defect is 1.5 meters. That is, the distance between the defect D1 shown in FIG. The distance between 2E and the first port 31a is 1.5 meter long. Since the sound source device 20 introduces at least one of the frequencies f, $f_1$, $f_2$ and $f_3$, within the target bandwidth bands t1, t2 and t3, the second data appears discrete points. The target point k is referred to as the frequency shift before and after an actual hole appears. In other words, the frequency of the returned wave of the target bandwidth bands t1, t2 and t3 when the pipeline is in the normal state is subtracted from the frequency of the returned wave of the target bandwidth bands t1, t2 and t3 when the pipeline has an actual hole. As such, the target point k of the second data overlaps the second curve C2 (the second aspect of the first data), thereby determining the position of the real defect. Similarly, when the target point k of the second data of the target information measured by the signal receiver 21 overlaps the first curve C1, as shown in FIG. 7C, the position of the real defect is at 70 meters. That is, a distance (a curved path) between the defect D2 shown in FIG. 2F and the first port 31a is 70 meters long. As such, the target point k of the second data overlaps the first curve C1 (the second aspect of the first data), thereby determining the position of the real defect.

In another embodiment, the simulated contents of the size of the imaginary defect (another kind of known imaginary

TABLE 4

| Comparing item | Signal source | Obtaining method | Captured contents | Corresponding data |
|---|---|---|---|---|
| reference information | simulating signals received by the signal receiver 21 or actually measuring | (1) computer program calculation (step S62, establishing the database 22) or (2) measuring the frequency signals of the original pipeline actually (having no hole) to establish the database 22 | (1) the first aspect of the first data (having no features of imaginary defect) and (2) the second aspect of the first data (having the features of imaginary defect) | the features of the known imaginary defect, and the sound pressure or frequency of the original pipeline |
| target information | actual measurement by the signal receiver 21 | values of measurement at different time for the pipeline or trough to be detected are subtracted (the detection process of step S63) | second data (e.g., target points k, i.e., the frequency shift before and after an actual hole appears) | the actual frequency of the returned wave (or propagated wave) of the pipeline or trough to be detected |

The comparison of the first data with the second data in the above table is shown as the frequency shift in FIG. 7B. FIG. 7B shows a relation of the first data of the reference information of the database 22 (second aspect) overlapping the target point k of the second data of the target information. A first curve C1 and a second curve C2 belong to the second aspect of the first data of the reference information of the database 22, wherein the first curve C1 and the second curve C2 are simulated after the imaginary defect is formed on the target object 3e. The first curve C1 corresponds to a position of the imaginary defect that is at 70 meters (the features of the known imaginary defect, the second aspect of the first data). The second curve C2 corresponds to a position defect) corresponding to the second aspect of the first data stored in the database 22 are taken as a comparing basis in the comparing process. As shown in FIG. 4C-2, the size of the real defect can be obtained after the target point k of the second data overlaps curves of FIG. 4C-2.

Therefore, in the detection method of the present disclosure, the target bandwidth band is determined by adjacent frequencies of the plurality of resonant sound waves generated in the target objects 3, 3' and 3a-3e (e.g., a pipeline or a cavity). The adjacent frequencies are found out and obtained by numerical simulation or other methods. The sound source device 20 enables to provide sound waves within a smaller range of frequency band actively. The number of the target bandwidth bands is determined based on the distribution complexity of the pipeline and the position or size of a defect. Thus, the frequency of the resonant sound wave of the target objects 3, 3' and 3*a*-3*e* (e.g., a pipeline) are strengthened and generated.

Further, the energy (strength) and bandwidth of the target bandwidth bands t1, t2, t3 and t4 are determined based on how each frequency is apparent (e.g., the frequencies f having a large dB variation shown in FIG. 4B-1). Therefore, several small dB ranges (sound pressures) within the target bandwidth bands t1, t2, t3 and t4 are selected as the input sounds for the sound source device 20. As such, the equipment cost of the detection system 2 is greatly reduced. Conducting the detection process by using at least two different frequencies as input sounds, cross-comparison and multiple verifications can be performed to improve the detection accuracy (e.g., the position determining error being less than about ±5 meters). Thereby, the area of road that should be dug is reduced due to low determining error and using a single signal receiver. Concerning cross-comparison as shown in FIGS. 7B and 7C, the target points k, after the different target bandwidth bands t1, t2, t3 and t4 are introduced/detected and subtraction calculation, are generally fitted to frequency curves. Concerning multiple verifications as shown in FIGS. 7B and 7C, the four target points k, after the same one target bandwidth band t1 is introduced/detected and subtraction calculation, are fitted to on frequency curve. It can be understood that the more the simulation data that the reference information approaches, the better the detection accuracy of the comparing process becomes.

An operator uses the relation between the second aspect of the first data of the reference information (e.g., the frequency shifts or volume variation of the resonant sound wave) and the features of the imaginary defect (a frequency curve obtained by numerically simulating or other methods), to estimate and confirm the features of the real defect corresponding to the second data of the target information (e.g., the position and/or size of an actual hole).

Since the pipeline on the scene will be in use for a long time, the pipeline needs to be detected periodically. Therefore, the detecting results (including errors) of the pipelines in the same region can be summarized as a historical record. In an embodiment, the contents of the second data of the target information (e.g., the target points k) and the features of the real defect corresponding thereto can be summarized, and the contents and the features act as the second aspect of the first data of the reference information (i.e., the historical record). When the detection is conducted in the future, the comparing process can be conducted by referring to the historical record (i.e., the overlapping of target points), to estimate and determine the features of the real defect more accurately.

In sum, the detection system and the detection method according to the present disclosure introduce the sound of the target bandwidth band by the sound source device into the target object. A standing wave sound field in the water, air or other fluid of the accommodating space is generated to form the resonant sound wave. Therefore, when resonant frequencies change, a defect can be detected. The first data, e.g., the frequency shift, can be used to identify the position and/or size of the real defect. Therefore, the energy is saved, and the software complexity is reduced. The equipment cost is reduced (e.g., employing a sound source of low dB and a single signal receiver), and the capability of detecting a defect can be greatly increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A detection system for detecting a defect of a target object having an accommodating space and a first port and a second port on the accommodating space, the detection system comprising:
   a sound source device disposed at the first port and configured for providing and inputting a sound through the first port into the accommodating space to generate a resonant sound wave;
   a signal receiver disposed at the second port; and
   a database configured for storing reference information derived from simulation of a signal generated after the resonant sound wave is received by the signal receiver, the reference information comprising first data having characteristics of the resonant sound wave and data having features of an imaginary defect formed on the target object, wherein the characteristics of the resonant sound wave are a frequency shift or strength, and the features of the imaginary defect corresponding to the characteristics of the resonant sound wave,
   wherein the signal receiver is configured for receiving the resonant sound wave to obtain target information and transmitting the target information to the database, the target information comprises second data having characteristics of the resonant sound wave when the target object has a real defect, and features of the real defect corresponding to the second data are derived from the features of the imaginary defect corresponding to the first data, by comparing the target information with the reference information.

2. The detection system of claim 1, wherein the accommodating space of the target object contains gas or fluid.

3. The detection system of claim 1, wherein the sound source device provides sounds of different frequencies.

4. The detection system of claim 1, wherein the sound source device provides sounds at different volumes.

5. The detection system of claim 1, wherein the resonant sound wave is in a standing wave state in the accommodating space.

6. The detection system of claim 1, wherein the characteristics of the resonant sound wave are a frequency shift or strength.

7. The detection system of claim 1, wherein the characteristics of the resonant sound wave in the reference information are derived from sounds of a plurality of simulation frequencies provided by the sound source device.

8. The detection system of claim 7, wherein the characteristics of the resonant sound wave in the target information are derived from sounds of a target bandwidth band provided by the sound source device.

9. The detection system of claim 8, wherein the target bandwidth band is within a range between any two of the plurality of simulation frequencies.

10. The detection system of claim 1, wherein the reference information is obtained from a computer simulation or obtained from simulation by a mechanism arrangement.

11. The detection system of claim 1, wherein the second data of the target information is a difference of two frequencies detected by the signal receiver at two different time.

12. The detection system of claim 1, wherein the features of the imaginary defect are at least one of positions and sizes, and at least one of positions and sizes of the features of the real defect are determined after the target information is compared with the reference information.

13. A detection method, comprising:
providing a target object having an accommodating space and a first port and a second port on the accommodating space, and disposing a sound source device at the first port and a signal receiver at the second port, respectively;
enabling the sound source device to input a sound via the first port into the accommodating space to generate a resonant sound wave;
simulating a signal generated when the resonant sound wave is received by the signal receiver and regarding the signal as reference information, wherein the reference information comprises first data having characteristics of the resonant sound wave and data having features of an imaginary defect formed on the target object, wherein the characteristics of the resonant sound wave are a frequency shift or strength, and the features of the imaginary defect correspond to the characteristics of the resonant sound wave;
when the target object has a real defect, the signal receiver obtaining target information where the resonant sound wave is received at the second port, wherein the target information comprises second data having characteristics of the resonant sound wave when the target object has the real defect; and
comparing the target information with the reference information to derive features of the real defect corresponding to the second data from the features of the imaginary defect corresponding to the first data.

14. The detection method of claim 13, wherein the resonant sound wave is in a standing wave state in the accommodating space.

15. The detection method of claim 13, wherein the first data are derived from sounds of a plurality of simulation frequencies provided by the sound source device.

16. The detection method of claim 15, wherein the second data are derived from sounds of a target bandwidth band provided by the sound source device.

17. The detection method of claim 16, wherein the target bandwidth band is within a range between any two of the plurality of simulation frequencies.

18. The detection method of claim 13, wherein the features of the imaginary defect are at least one of positions and sizes, and at least one of positions and sizes of the features of the real defect are determined after the target information is compared with the reference information.

* * * * *